United States Patent
Rettberg et al.

(10) Patent No.: US 11,111,800 B2
(45) Date of Patent: Sep. 7, 2021

(54) METHOD FOR MANUFACTURING AN IMPELLER OF A ROTARY MACHINE AND AN IMPELLER MANUFACTURED USING SUCH A METHOD

(71) Applicant: Sulzer Management AG, Winterthur (CH)

(72) Inventors: Robin Rettberg, Winterthur (CH); Kaspar Löffel, Küsnacht (CH); Jonas Ess, Basel (CH); Marc Huber, Vogelsang AG (CH); Martin Hartmann, Windisch (CH)

(73) Assignee: SULZER MANAGEMENT AG, Winterthur (CH)

( * ) Notice: Subject to any disclaimer, the term of this patent is extended or adjusted under 35 U.S.C. 154(b) by 410 days.

(21) Appl. No.: 15/994,063

(22) Filed: May 31, 2018

(65) Prior Publication Data

US 2019/0003322 A1 Jan. 3, 2019

(30) Foreign Application Priority Data

Jun. 30, 2017 (EP) ..................................... 17178975

(51) Int. Cl.
*F01D 5/34* (2006.01)
*B22F 5/00* (2006.01)
(Continued)

(52) U.S. Cl.
CPC ................ *F01D 5/34* (2013.01); *B22F 5/009* (2013.01); *B22F 10/20* (2021.01); *B23K 26/342* (2015.10);
(Continued)

(58) Field of Classification Search
CPC ......... B33Y 10/00; B33Y 30/00; B33Y 40/00; B33Y 50/02; B33Y 70/00; B33Y 70/10;
(Continued)

(56) References Cited

U.S. PATENT DOCUMENTS

| 3,628,881 A * | 12/1971 | Herrmann, Jr. ...... F04D 29/2216 415/119 |
| 2006/0140767 A1* | 6/2006 | Garman .................. B22F 5/085 416/182 |

(Continued)

FOREIGN PATENT DOCUMENTS

| EP | 2012957 B1 | 1/2010 |
| WO | 2016127225 A1 | 8/2016 |

OTHER PUBLICATIONS

Selective laser melting—Wikipedia, the free encyclopedia (Year: 2016).*

(Continued)

*Primary Examiner* — Brian P Wolcott
*Assistant Examiner* — Justin A Pruitt
(74) *Attorney, Agent, or Firm* — Global IP Counselors, LLP (57) ABSTRACT

A method for manufacturing an impeller of a rotary machine, the impeller including at least one vane limiting an inner channel, which is at least partly closed, the method includes successively manufactured the impeller of several material layers by a build-up process from a powder. The powder is applied in each case to a processing plane for the production of each material layer, and then a solid material layer is produced from the powder by a selective energy input, and structural orientation is determined for the impeller, according to which the impeller is built up in layers, and the structural orientation is defined by a first and a second angle, which angles describe the relative position of the impeller to the processing plane.

19 Claims, 6 Drawing Sheets

(51) Int. Cl.
*B22F 10/20* (2021.01)
*B33Y 10/00* (2015.01)
*B33Y 40/00* (2020.01)
*B33Y 80/00* (2015.01)
*B23K 101/00* (2006.01)
*B23K 26/342* (2014.01)
*F01D 5/04* (2006.01)

(52) U.S. Cl.
CPC ............... *B33Y 10/00* (2014.12); *B33Y 40/00* (2014.12); *F01D 5/043* (2013.01); *B23K 2101/001* (2018.08); *B33Y 80/00* (2014.12); *F05D 2230/50* (2013.01); *F05D 2240/30* (2013.01)

(58) Field of Classification Search
CPC . B33Y 80/00; F05D 2230/50; F05D 2240/30; F01D 5/34; F01D 5/043; B23K 26/342; B23K 2101/001; B22F 3/105; B22F 3/1055; B22F 5/009; B22F 2003/1058; Y02P 10/25
See application file for complete search history.

(56) References Cited

U.S. PATENT DOCUMENTS

2016/0250810 A1* 9/2016 Lynch August ... G05B 19/4099
700/98
2017/0107821 A1* 4/2017 Schwarz ................... F01D 5/34

OTHER PUBLICATIONS

Extended European Search Report dated Dec. 8, 2017 in corresponding European Patent Application No. 17178975.3, filed Jun. 30, 2017.
Strand, Giovanni. "Multi-objective optimisation in additive manufacturing—Chapters 5 and 6", XP055429984, May 1, 2012.

* cited by examiner

METHOD FOR MANUFACTURING AN IMPELLER OF A ROTARY MACHINE AND AN IMPELLER MANUFACTURED USING SUCH A METHOD

CROSS-REFERENCE TO RELATED APPLICATION

This application claims priority to European Application No. 17178975.3, filed Jun. 30, 2017, the contents of which are hereby incorporated herein by reference.

BACKGROUND

Field of the Invention

The invention relates to a method for manufacturing an impeller of a rotary machine and to an impeller of a rotary machine.

Background of the Invention

In the manufacturing of impellers of rotary machines such as e.g. pumps, turbines, compressors, compactors or expanders it is known to manufacture impellers as a component out of a blank by a machining process or by a cutting process, for example by milling. In doing so, the blank can be present as a solid material or can already be preprocessed by a primary shaping process. It is also known to manufacture impellers by a primary shaping process as a whole, for example by casting.

Such a method is known from EP-B-2 012 957, for example. The method proposed there is in particular characterized by allowing a machining manufacturing of the component, that is to say that the component is at least essentially brought into the desired final form as a whole out of the blank by a machining device. The assembling of preprocessed parts of the component, for example by welding, is no longer necessary with such integral manufacturing.

Impellers can be manufactured of solid material, depending on the application, e.g. of high-strength stainless steels, duplex steel, super alloys, other suitable metals or metal alloys or also of non-metallic materials, for example ceramic materials and the vanes and channels of the impeller are elaborated out of this material by cutting processes, for example by milling.

As already explained in EP-B-2 012 957, sometimes machine manufacturing of the component as a whole is not possible for purely geometrical reasons. This can be the case, for example, when the impellers are designed as covered or closed impellers. In such a design the impeller comprises a shroud, on which the vanes are arranged and also a cover plate covering the vanes completely or at least partially at the side facing away from the shroud. Hence, at least partially closed channels are formed between the vanes, the channels extending in each case from the center of the impeller to its outer radial limiting surface.

Even if considering that these channels could be milled out of the blank or processed by machining on both sides, respectively, that means from the interior of the impeller and also from its radial limiting surface by a machining device, it is obvious, that geometry is here subject to limits and in many cases a machining manufacturing as a whole is impossible.

In such cases, if it is no longer possible or practicable to mill the impeller as a whole out of solid material for purely geometrical reasons, it is therefore one of the possible alternatives to manufacture the impeller completely by a build-up process, which is also referred to as generative or additive process.

In a build-up process, the impeller the is built up directly from a shapeless or neutrally shaped material. In this case, the shapeless material, e.g. a powder, or the neutrally shaped material, e.g. a strap-shaped material or a wire, is usually melted to build up the desired structure.

The build-up process usually comprises several additive or generative process steps, in which the desired structures are generated of a shapeless material, for example liquids or powder, or of a neutrally shaped material, for example strap-shaped or wire-shaped material, by chemical and/or physical processes. Additive manufacturing methods known per se, in particular for metallic materials, are for example build-up welding methods, in particular inert gas methods as tungsten inert gas welding (TIG) or laser build-up welding or plasma methods or selective laser melting (SLM) or selective laser sintering (SLS).

In beam melting processes, such as SLM or electron beam melting, the impeller, or generally the component, is built up successively of several material layers, wherein a powder is applied in each case to a processing plane for the production of each material layer and then a solid material layer is produced from the powder by a selective energy input.

This is done by applying the material in powder form in a thin layer to the processing plane. Then, this powder is selectively locally melted by energy irradiation, for example by laser radiation and forms a solid material layer after solidification. Subsequently, the processing plane is lowered by the amount of a layer thickness and powder is applied again in a thin layer on the processing plane in order to generate the next solid material layer. The process is repeated until the component is completely built up. Subsequently, the component can be reprocessed, wherein e.g. excess powder or excess material is removed or surfaces are smoothed, ground, polished or otherwise reprocessed, or wherein the component is subjected to a heat treatment.

By building up in layers by means of such a method, it is usually necessary, in particular in such complex and especially geometrically complex structures, as represented by impellers and specially closed impellers, that support structures must be built up together with the material layers, which support structures then support material layers, which are generated in subsequent build-up steps or which support structures form a base on which subsequent material layers can be built up. For example, if material layers are to be built up having strongly overhanging areas with respect to the already solidified material layers, i.e., for example when changing from a structure perpendicular to the processing plane to a structure parallel to the processing plane, such support structures must first be generated, on which subsequently such overhanging areas can be built up. In general, it is assumed, that support structures are needed at the latest when the down-skin angle—measured against the processing plane—falls below a value of 40°-50°, for example 45°. Similarly, support structures are needed, for example, for the generation of cavities, very thin-walled areas or channels, to name just a few examples.

In addition to the pure support of material layers to be produced, the support structures usually have other functions, for example the dissipation of heat, or the prevention of distortions or unwanted curvatures in the component to be manufactured.

It is clear, that the support structures must be removed from the component after completion of the build-up process. Therefore, the support structures often include predetermined breaking points. It is also known, to generate the support structures with a lower density, for example porous, or hollow inside, or with honeycomb or grid structures. It is also possible to build up the support structures from rod-shaped or plate-shaped substructures or from stilts, in order to use as little powder material as possible for the support structures and to ensure that they are easy to remove.

SUMMARY

It is been found, in the build-up process of a complex component by successive generation of several material layers from a powdery material, that the orientation of the component to be produced relative to the processing plane plays an essential role. In particular, this orientation has a direct influence on the production costs, the time required for production, the demand for powder material, the process stability, the quality of the manufactured component, or the extent and type of the necessary post-processing of the manufactured component.

In particular, for the manufacturing of such complex components as impellers of rotary machines and specially closed or covered impellers, it is therefore a significant problem in practice, to find a suitable orientation for the respective impeller, in which the impeller can be built up efficiently. The present invention is dedicated to this problem.

Starting from this state of the art, it is therefore an object of the invention to propose a method for manufacturing an impeller of a rotary machine, in which method the impeller is successively manufactured of several material layers by a build-up process from a powder, wherein the method should enable a particularly efficient and good orientation for the structure of the impeller to be produced. Furthermore, the invention is expected to propose a corresponding impeller.

The objects of the invention meeting this problem are characterized by the features described herein.

According to the invention, a method for manufacturing an impeller of a rotary machine is proposed, which impeller comprises at least one vane limiting an inner channel which is at least partly closed, in which method the impeller is successively manufactured of several material layers by a build-up process from a powder, wherein the powder is applied in each case to a processing plane for the production of each material layer, and then a solid material layer is produced from the powder by a selective energy input, and wherein a structural orientation is determined for the impeller, according to which the impeller is built up in layers, and wherein the structural orientation is defined by a first and a second angle, which angles describe the relative position of the impeller to the processing plane.

It is an essential feature, that the structural orientation, in which the impeller is built up relative to the processing plane, can only be defined by two angles. Hereby, it is possible in a particularly simple manner to optimize the structural orientation for the respective application by varying the first and the second angle. This optimizing can be carried out in particular computer-aided, for example with CAD programs or special programs for additive manufacturing. Since only two parameters, namely the first and the second angle, are varied during optimizing, an optimal structural orientation for the respective application can be determined in a simple and reliable way, in order to ensure a particularly efficient and good manufacturing of the impeller. In doing so, various aspects can be foregrounded during the optimizing for determining a good and suitable structural orientation, for example, the lowest possible structure height, the shortest possible build-up time, a minimum number of material layers, the smallest possible number of support structures, the best possible accessibility for the removal of the support structures, the best possible surface quality (e.g. roughness), or combinations of these aspects. Of course, the respective optimum structural orientation is determined before the manufacturing of the impeller and then defined. Subsequently, the impeller is manufactured with this determined and defined structural orientation in a build-up process.

According to a preferred embodiment, support structures are produced from the powder together with the material layers by a build-up process, wherein the support structures are removed after completion of the build-up process and further, the first and the second angle are optimized, so that the support structures are minimized. In this embodiment, the optimal structural orientation is thus determined under the aspect that the support structures are minimized. This has the advantage that as little material as possible, i.e. powder, is required for the production of the support structures, and that the amount of work involved in removing the supporting points can be kept to a minimum.

Particularly preferred, the first angle indicates the angle between an axis of rotation of the impeller to be manufactured and a w-axis which is perpendicular to the processing plane and points in the direction of the build-up process.

According to a preferred embodiment of the method according to the invention, the first and the second angle describe the relative position of a component coordinate system to a processing coordinate system, wherein the component coordinate system is fixed with respect to the impeller and the processing coordinate system is fixed with respect to the processing plane, wherein the component coordinate system has a z-axis, which is defined by the axis of rotation of the impeller, and an x-axis, which is defined by a connecting line, which is perpendicular to the z-axis and connects the z-axis with a trailing edge of the vane, and wherein the processing coordinate system comprises an u-v-plane, which is defined by the processing plane, and a w-axis, which is perpendicular to the u-v-plane and points in the direction of the build-up process.

It is a particularly preferred measure, that the structural orientation is defined relative to an initial orientation, in which initial orientation the z-axis coincides with the w-axis and the x-axis lies in the u-v-plane.

Preferably, the component coordinate system is first rotated by the first angle about the x-axis starting from the initial orientation, and then rotated by the second angle about the z-axis to realize the structural orientation.

Furthermore, it is preferred, if the impeller has a plurality of vanes and a plurality of inner channels, wherein adjacent channels are each separated by a vane.

It is advantageous with regard to the inner channel or the inner channels, if the first and the second angle are optimized, so that support structures are avoided in those areas of each inner channel, which are not or only with difficulty accessible for a removal of the support structures. This means, that in the optimizing of the structural orientation in particular the aspect is foregrounded, that those areas of the impeller, which are no longer accessible or only accessible with great effort after its completion are free of support structures. In particular, such structural orientations are avoided in which support structures are necessary, which are so far inside the channels, that after completion of the impeller they can only be removed with great difficulty, i.e. with great effort, or even not at all, because they cannot be reached from either end of the canal with reasonable effort.

It has proven to be particularly favorable for a large number of applications, if the first angle is at least 70° and at most 90°, preferably at least 75° and at most 85° and particularly preferred about 80°.

Preferably, the second angle is at most as large as the quotient of 360° and the number of vanes.

It has proven to be advantageous for a large number of applications, if the second angle is at least 50° and at most 60°, preferably about 54°.

These values for the second angle are particularly advantageous for those impellers, in which the impeller has exactly five or exactly six vanes.

Preferably, the energy input for the build-up process is carried out by a laser.

Particularly preferred, the build-up process is carried out by selective laser melting. Nowadays, this generative production method is a known and established method, which is particularly suitable for the method according to the invention.

Furthermore, an impeller for a rotary machine is proposed by the invention, in particular for a pump, a turbine, a compressor, a compactor or an expander, wherein the impeller is manufactured by a method according to the invention.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

The method according to the invention is used to manufacture an impeller of a rotary machine, wherein the impeller comprises at least one vane limiting an inner channel, which is at least partly closed. A closed channel refers to a channel, which is completely closed apart from an inlet or an outlet, i.e. it is tubular, that is, the channel is limited everywhere by one or more walls perpendicular to its main flow direction. In contrast, an open channel refers to a channel, which is not limited by a wall in a direction perpendicular to its main flow direction, i.e. in a direction perpendicular to its longitudinal extension, but it is open. Thus, for example, a channel with a u-shaped or a v-shaped wall is an open channel. If the open side of the u-profile or of the v-profile were covered with a covering, the channel would be a closed channel.

A partially closed channel means a channel, which is partially designed as a closed channel and partially as an open channel.

In the following description of the invention it is referred to an important embodiment for practice with an exemplary nature, wherein the impeller is a closed or a covered impeller of a rotary machine, e.g. of a pump, in particular of a centrifugal pump, of a turbine or of a compressor. For a better understanding, an embodiment of such an impeller will be described first.

Figure 1:
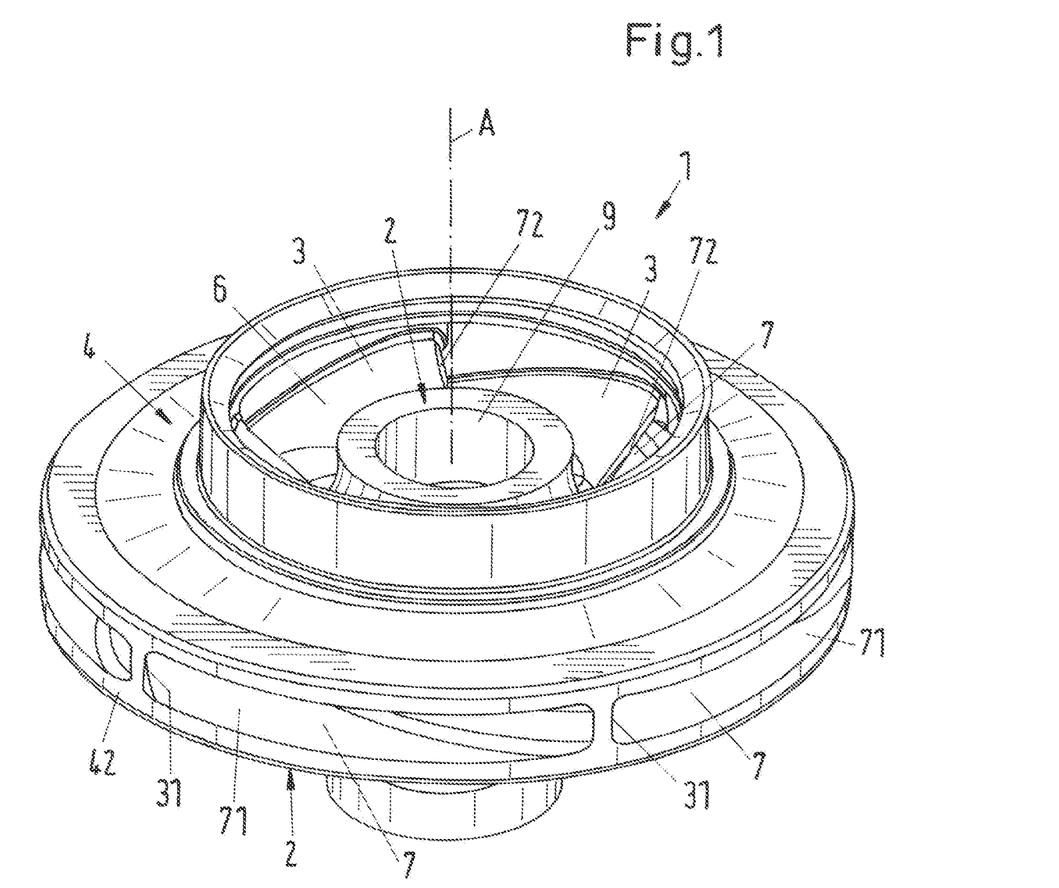
FIG. 1 is a perspective view of an embodiment of an impeller according to the invention, which is manufactured according to an embodiment of a method according to the invention.
Figure 2:
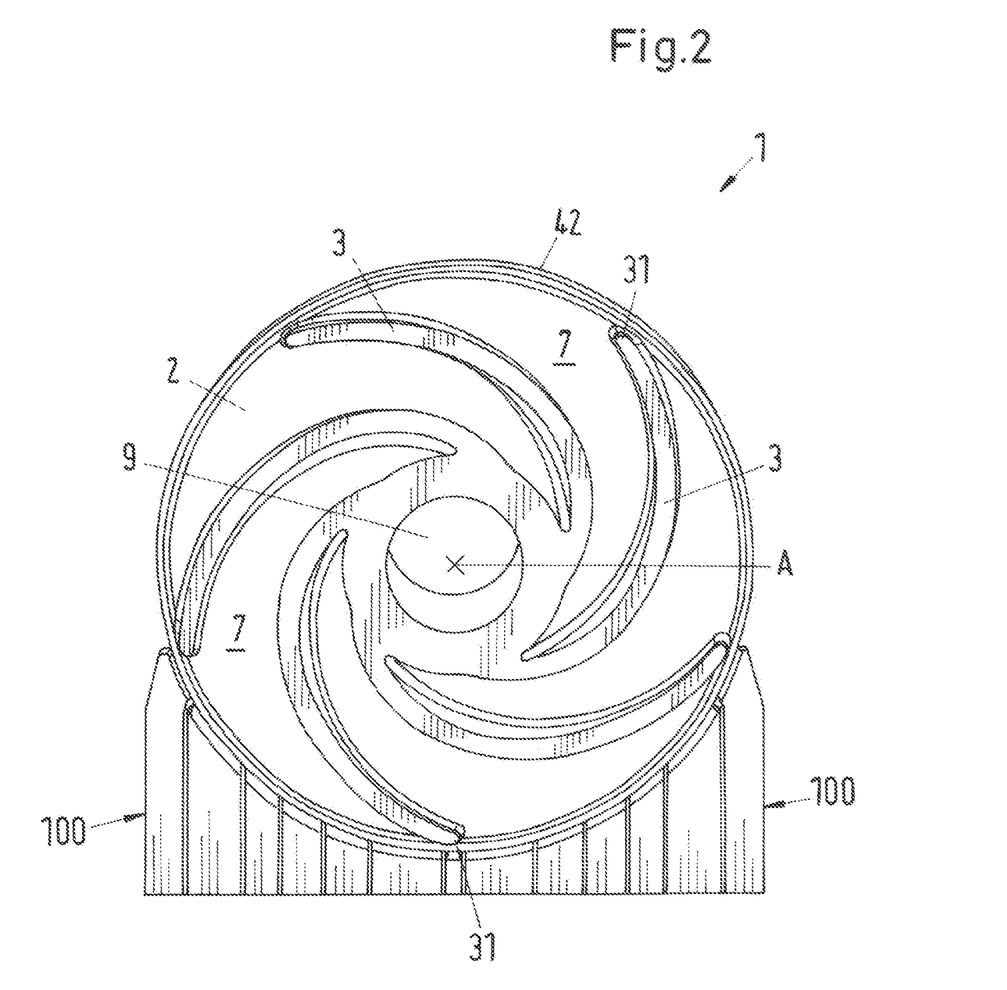
FIG. 2 is a perspective sectional view of the impeller from FIG. 1 in a section across the axis of rotation of the impeller.

FIG. 1 shows a perspective view of an embodiment of an impeller according to the invention, which is designed as a closed or a covered impeller and which is referred to as a whole with the reference sign 1. The impeller 1 can be manufactured by a method according to the invention. FIG. 2 shows a perspective sectional view of the impeller 1 from FIG. 1 in a section across the axis of rotation A of the impeller 1. In addition, support structures 100 are illustrated in FIG. 2, which will be explained later.

The axis of rotation A of the impeller 1 refers to the axis of rotation around which the impeller 1 rotates in the operating state and installed in a rotary machine. An axial direction is defined by the axis of rotation A. Thus, the axial direction refers to that direction, in which the axis of rotation A extends.

The impeller 1 comprises a shroud 2 in a manner known per se, with which the impeller 1 usually is mounted or fixed on an axis or a shaft, not shown here, and also a number of vanes 3, which are arranged on the shroud 2 and a cover plate 4 covering the vanes 3 at least partially at the side or edge facing away from the shroud 2. According to the description (FIG. 1), the cover plate 4 extends higher than the shroud 2 with respect to the axial direction. As a result, according to the description, an internal space 6 is formed above the vanes 3, the space being limited by the cover plate 4 with respect to the radial direction, i.e. perpendicular to the axial direction. This internal space 6 represents the inlet in the operating state, through which a fluid flows to the impeller 1. An inner channel 7 exists in each case between two adjacent vanes 3, which channel is designed as an at least partially closed channel 7 and here as a closed channel 7.

Each channel 7 extends from a first end 72 in a center of the impeller 1, which is formed by the internal space 6, to a respective second end 71 in a limiting surface 42 of the impeller 1. The limiting surface 42 represents the radially outer surface of the impeller 1, which surface extends parallel or concentric to the axial direction, that is to say, the surface limiting the impeller 1 in the radial direction. The limiting surface 42 comprises the radially outer surfaces of the cover plate 4 and of the shroud 2 and the radially outer closing edges of the vanes 3, which are called trailing edges 31.

Thus, adjacent channels 7 are each separated by a vane 3.

In the embodiment described here, the impeller 1 comprises five vanes 3 in total, as can best be seen in FIG. 2. The wrap angle of each vane 3 is preferably at least 90° and at most 180°. Of course, the invention is not limited to impellers 1 with five vanes, but is also suitable for impellers with less or more vanes. According to another preferred embodiment, the impeller 1 has exactly six vanes.

The impeller 1 (FIG. 1) also has a continuous central axial opening 9, which is used to receive a shaft or an axis, on which the impeller 1 can be mounted.

In the following, an embodiment of the method according to the invention is explained in more detail. First, the desired geometric final shape of the impeller 1 is determined. Then, the impeller 1 is successively built up of several material layers by a build-up process from a powder according to the desired geometric final shape, wherein support structures 100 are additionally generated in this process, on which subsequently generated material layers can be built up. These support structures 100 are auxiliary structures for the build-up process, which are removed after the completion of the build-up manufacturing process.

As is known per se, the geometric final shape of the impeller 1 can be saved in the form of data in a computer, e.g. in the form of three-dimensional geometric data or data models, which are then used to control the device for the build-up process.

In contrast to the subtractive process, the build-up process is a method in which no material is removed. The build-up process, which is also known as additive or generative manufacturing, usually comprises a plurality of successively performed additive processing steps. An additive or generative processing step or an additive or generative manufacturing refers to a manufacturing, in which a shapeless or a neutrally shaped material is applied. In doing so, a solid material layer is usually produced by a selective energy input out of a shapeless material, for example a powder, or out of a neutrally shaped material, for example a strap-shaped material or a wire-shaped material in order to build up the still missing parts of the impeller 1 on the already existing previously generated structure. Thus, a build-up process is a process out of a shapeless or a neutrally shaped material.

In the method according to the invention, in each case a powder is applied as a thin layer to a processing plane in order to produce the respective material layer. Subsequently, a solid material layer is produced by selective energy input into the processing plane from the powder. The already built up structure of the impeller 1 is then lowered by the thickness of a material layer relative to the processing plane, a thin layer of powder is again applied to the processing plane and then the next solid material layer is generated by an energy input.

The process of selective laser melting (SLIM) is preferably used for the method according to the invention, in which a component is built up in layers according to this principle.

A metallic material, e.g. a metal or an alloy, is used in particular as the material for the construction of the impeller 1, which metallic material is provided in each case in powder form on the processing plane. For the production of the impeller 1, the following materials are particularly suitable: stainless steels, austenitic stainless steels, for example a steel with the type designation 316L, duplex steels, nickel-based alloys, for example the alloys known by the trade name Inconel, in particular Inconel 625, cobalt-based alloys, aluminum alloys, titanium alloys or hard metals.

The method of selective laser melting for the layer-by-layer completely generative structure of a component is a method, which is well known per se, which therefore requires no further explanation. In this method, which is known per se, the material to be processed is held in powder form in a thin layer in the processing plane. The powdery material is locally completely melted by laser radiation and forms a solid material layer after solidification. Subsequently, the workpiece is lowered by the amount of a layer thickness, and material in the form of powder is applied again on the processing plane, which is then locally melted again by means of laser radiation. This cycle is repeated until the component, here the impeller 1, is completely built up.

The processing plane is that plane in which the local energy input is affected in each case by laser radiation, in order to selectively melt the powder and to produce the solid material layer.

As is known per se, support structures 100 (FIG. 2) are usually generated from the powder in the processing plane together with the material layers during the layered build-up by SLM, which support structures are used to generate a basis, on which on structures of the impeller 1 can then be built up in subsequent processing steps, which cannot be built up or cannot be built up with a sufficient quality without these support structures 100. As an example, structures are mentioned here that are strongly overhanging with regard to the processing plane. For example, if you want to build up a structure which extends essentially parallel to the processing plane, it is necessary to generate a corresponding support structure 100 in advance, which is then used as a basis in subsequent processing steps, on which these structures of the impeller 1 extending parallel to the processing plane can be built up.

However, there are other reasons for constructing such support structures 100. For example, it may be necessary to provide support structures 100 for generating internal cavities or internal hollows in the impeller 1. It is also possible, for example to support very thin-walled structures of the impeller 1 to be manufactured with support structures, so that these do not warp or bend. The provision of such support structures 100 per se is a measure known in the SLM method, which is therefore not explained in detail here. However, it should be mentioned that the support structures 100 can also fulfil other functions apart from the support function, for example, the dissipation of heat from the structures already built or during the respective melting process.

In order to build up the impeller 1 in layers by the build-up process, here of the selective laser melting, first a structural orientation is defined, in which the impeller is built up relative to the processing plane. The structural orientation is a fixed orientation, which is not changed during the generative building process. The structural orientation corresponds to that orientation in which the impeller 1 is immediately after completion of the build-up process relative to the processing plane. It is clear, that the configuration and the position of the support structures 100 and also the number of individual material layers to be built up depend on the selected structural orientation.

Of course, the appropriate structural orientation has to be defined before the start of the build-up process. After the structural orientation has been fixed, the impeller 1 can be built up in layers by SLM according to this structural orientation.

According to the invention, it is proposed that this structural orientation is defined by a first angle $\beta$ and a second angle $\alpha$, wherein the angles $\beta$, $\alpha$ describe the relative position of the impeller 1 to the processing plane.

The measure of describing the structural orientation merely by two angles $\beta$, $\alpha$ has the advantage, that by varying only two parameters, namely the angle $\beta$, $\alpha$ in an optimizing process, a particularly favorable structural orientation for the respective application can be determined. Different aspects can be foregrounded for optimizing: for example the lowest possible structure height, the shortest possible build-up time, a minimum number of material layers, the smallest possible number of support structures, the best possible accessibility for the removal of the support structures, the best possible surface quality (e.g. roughness), or combinations of these aspects.

To determine the appropriate structural orientation for the impeller 1, two aspects are preferably considered, namely that as few support structures 100 as possible are needed, and that the support structures 100 are provided at points where they can be removed after completion of the build-up process with the least possible effort. The first aspect is intended to keep the material requirements for the support structures 100 as low as possible and the amount of work for the subsequent removal of the support structures 100 the second aspect is intended to prevent support structures 100 having to be generated in points, which are only very difficult or no longer accessible after completion of the build-up process to remove the support structures 100. For example, it should be prevented that support structures 100 are built up in the inner areas of channels 7, which can be reached after completion of the build-up process of neither the first end 72 of the second end 71 of the respective channel 7 in a simple manner.

First, the desired geometric final shape of the impeller 1 is defined to determine a suitable structural orientation. A starting value for the structural orientation is then selected, for example based on experience values, which starting value is described by the first and the second angle $\beta$, $\alpha$. For this starting value, it is then preferably determined with computer support which support structures 100 are required in order to generate the impeller 1 generatively in this specific structural orientation. In this case, the position of the support structures and their respective geometric configuration can be determined. Then, starting from this starting value for the structural orientation, the two angles $\beta$, $\alpha$ are varied until an optimized structural orientation is determined. According to this optimized structural orientation, the impeller 1 is then built up by means of SLAT The determination of the respective required support structures 100 during the optimizing process can be carried computer-aided, in particular with CAD software known per se or special computer program products known per se for constructive or additive manufacturing. Of course, empirical data or empirical values can also be used for the optimizing process.

A preferred embodiment for defining or determining the first angle $\beta$ and the second angle $\alpha$ will now be explained in more detail below with reference to FIG. 3-7.

Preferably the first angle $\beta$ (see in particular FIG. 4 and FIG. 6) is the angle between the axis of rotation A of the impeller 1 to be manufactured and a w-axis W, which is perpendicular to the processing plane and points in the direction of the build-up process.

The processing plane, which is the plane in which the respective material layer is produced by local melting of the powder by means of laser radiation, is defined by the device with which the SLM method is performed. The w-axis W is a perpendicular axis on this processing plane, which points in the direction of the built-up process. During the built-up process, the impeller 1 to be manufactured is moved by the amount of a layer thickness in the direction of the negative w-axis W, i.e. according to the illustration (FIG. 3 to FIG. 7) moved downward in each case after completion of the production of a solid material layer in the processing plane, to generate then the next material layer in the processing plane.

To determine the appropriate structural orientation, preferably two coordinate systems are defined, wherein the two angles $\beta$, $\alpha$ describe the relative position of these two coordinate systems to each other.

The first coordinate system is a component coordinate system, which is fixed with respect to the impeller 1. The second coordinate system is a processing coordinate system, which is fixed with respect to the processing plane—and thus with respect to the device for perforating the selective laser melting.

In the embodiment described here, both the component coordinate system and the processing coordinate system are each a right-angled Cartesian coordinate system.

The component coordinate system has a z-axis Z, which is defined by the axis of rotation A of the impeller 1 and a x-axis X and a y-axis Y, which are each perpendicular to the z-axis Z. The origin O of the component coordinate system is on the z-axis Z, i.e. on the axis of rotation A of the impeller 1 and in the geometric center of the vanes 3, around which the vanes 3 of the impeller 1 are arranged. Thus, the origin O is on the axis of rotation A and with respect to the axial direction at half the height of the vanes 3. The x-axis X is defined by a connecting line, which is perpendicular to the z-axis and which connects the origin O on the z-axis Z with one of the trailing edges 31 of the vanes (see FIG. 3). Due to the rotational symmetry of the impeller 1, it does not matter which of the trailing edges 31 of the vanes 3 is selected for defining the x-axis X. The y-axis Y of the component coordinate system is perpendicular to both the x-axis X and the z-axis Z. However, the position of the y-axis Y is of no importance for the determination of the structural orientation.

The processing coordinate system is fixed with respect to the device for the build-up process, here by the device for the selective laser melting. The processing coordinate system comprises an u-v-plane, which is defined by the processing plane, i.e. the processing plane lies completely in the u-v-plane or coincides with the u-v-plane. The concrete position of the u-axis U and the perpendicular v-axis V, which stretch the u-v plane of the processing coordinate system is not essential and can be selected as required. It is only essential that both the u-axis U and the v-axis V are in the processing plane. Thus, the origin S of the processing coordinate system is also in the processing plane. The w-axis W of the processing coordinate system is perpendicular on the processing plane and thus, on the u-v-plane and points in the direction, where the impeller 1 is built up, i.e. upwards as shown in the illustration (FIG. 3-FIG. 5).

Figure 3:
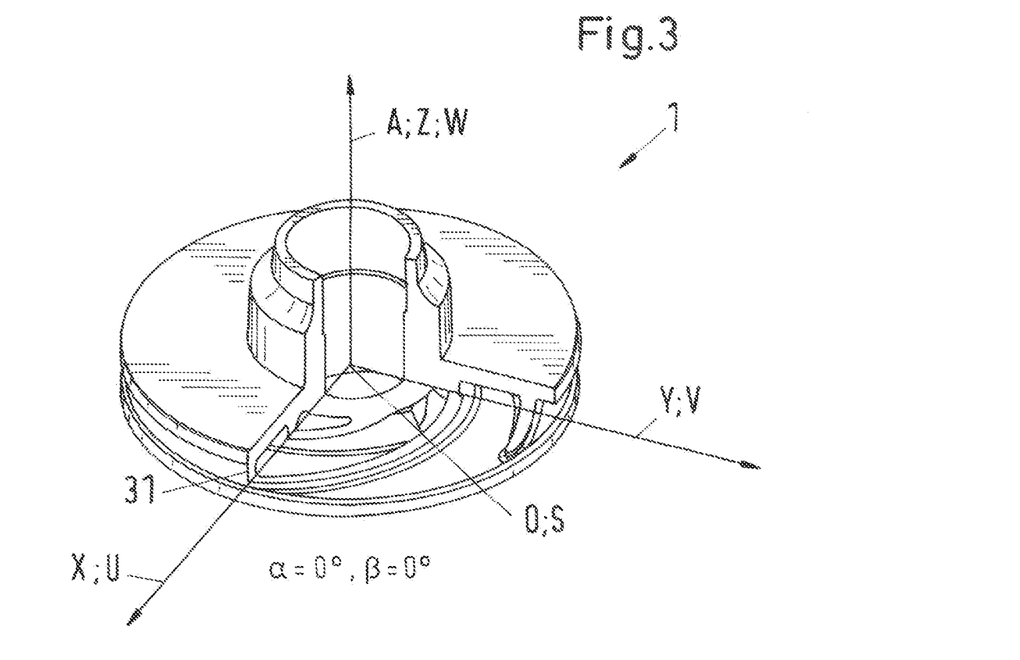
FIG. 3 is a partially sectional view of the impeller from FIG. 1 in the initial orientation.

The structural orientation to be determined by means of the optimizing is defined relative to an initial orientation, which is shown in FIG. 3.

FIG. 3 shows the impeller 1 in a partially sectional view, wherein the carved-out section is selected that way, that the position of the two coordinate systems is better recognizable. In the initial orientation shown in FIG. 3, the z-axis Z of the component coordinate system coincides with the w-axis W of the processing coordinate system and the x-axis X of the component coordinate system lies in the u-v-plane of the processing coordinate system, i.e. in the processing plane. As a consequence, the origins O, S of the two coordinate systems coincide. Since, as stated above, the concrete position of the u-axis U and the v-axis V does not matter, for the sake of clarity, these two axes are defined in such a way without restriction of generality, that the u-axis U coincides with the x-axis X and the v-axis V with the y-axis Y. As a result, the three axes U, V, W of the processing coordinate system coincide with the three axes X, Y, Z of the component coordinate system.

Figure 4:
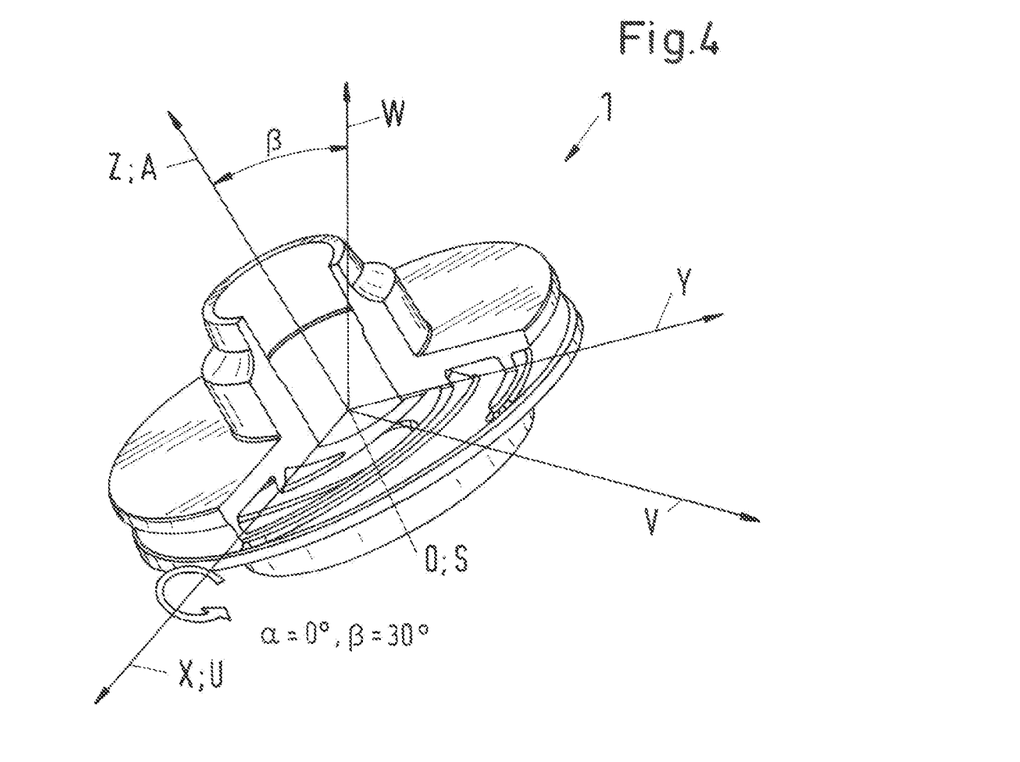
FIG. 4 is a partially sectional view of the impeller from FIG. 1 in an orientation, in which the first angle β is 30°.
Figure 5:
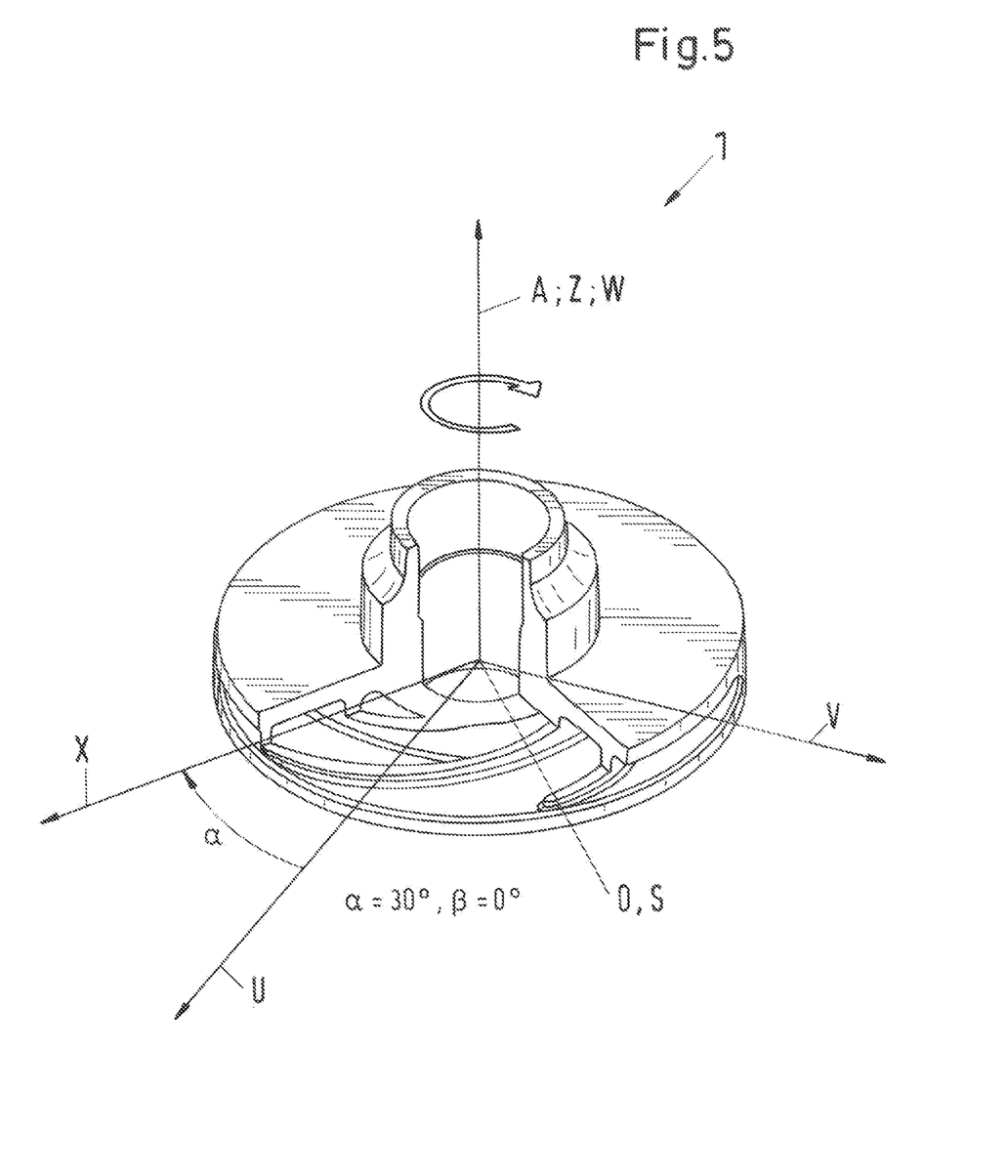
FIG. 5 is a partially sectional view of the impeller from FIG. 1 in an orientation, in which the second angle α is 30°.

It should be noted that the illustration in FIG. 3, FIG. 4 and FIG. 5 with the respective impeller 1 already manufactured serves to explain the determination of the structural orientation. In the actual manufacturing process, the impeller 1 is built up successively from bottom to top as shown in the illustration, i.e. in the direction of the w-axis W. After each processing step in which a solid layer of material has been produced, the impeller 1 is moved downward by a layer thickness as shown in the illustration, so that the next layer of material to be produced is again in the processing plane. This means, that during the build-up process the component coordinate system is moved stepwise, namely in each case by one layer thickness, relative to the processing coordinate system in the direction of the negative w-axis—i.e. downwards as shown in the illustration, i.e. the origin O of the component coordinate system moves downwards on the w-axis of the processing coordinate system as shown in the illustration, i.e. in the direction of the negative w-axis W or on the negative w-axis W. Thus, after completion of the built-up process, the impeller 1 is completely below the processing plane, i.e. the u-v-plane of the processing coordinate system.

However, for a better understanding, the complete impeller 1 (each with carved-out section) is shown in FIGS. 3 to 5 and the two coordinate systems are drawn in such a way that their origins O and S coincide.

Starting from the initial orientation shown in FIG. 3, the component coordinate system is first rotated counterclockwise by the first angle β (i.e. in the mathematically positive sense) about the x-axis of the component coordinate system and then by the second angle α counterclockwise about the Z-axis of the component coordinate system.

These two rotations are illustrated in FIG. 4 and FIG. 5. FIG. 4 shows the impeller 1 in a representation analogous to FIG. 3, after the impeller 1 and thus the component coordinate system has been rotated by the first angle β around the x-axis of the component coordinate system starting from the initial orientation (FIG. 3). The direction of rotation is indicated in FIG. 4 by the arrow without a reference sign. By this first rotation, the z-axis Z of the component coordinate system is tilted with respect to the w-axis W of the processing coordinate system, so that these two axes then enclose the first angle β. In the example of FIG. 4, the first angle β has the value 30°.

Subsequently, the impeller 1 is rotated by the second angle α about the z-axis of the component coordinate system. If the first angle β is not equal to zero, this second rotation results in the fact, that the x-axis of the component coordinate system, and thus the trailing edge 31 of the vane 3, is turned out of the u-v-plane of the processing coordinate system and thus out of the processing plane.

For a better understanding of the second angle α, FIG. 5 shows in a representation analogous to FIG. 4, the result of the second rotation in the event that the first angle β is selected equal to zero. The second angle α has the value 30° in FIG. 5.

Figure 6:
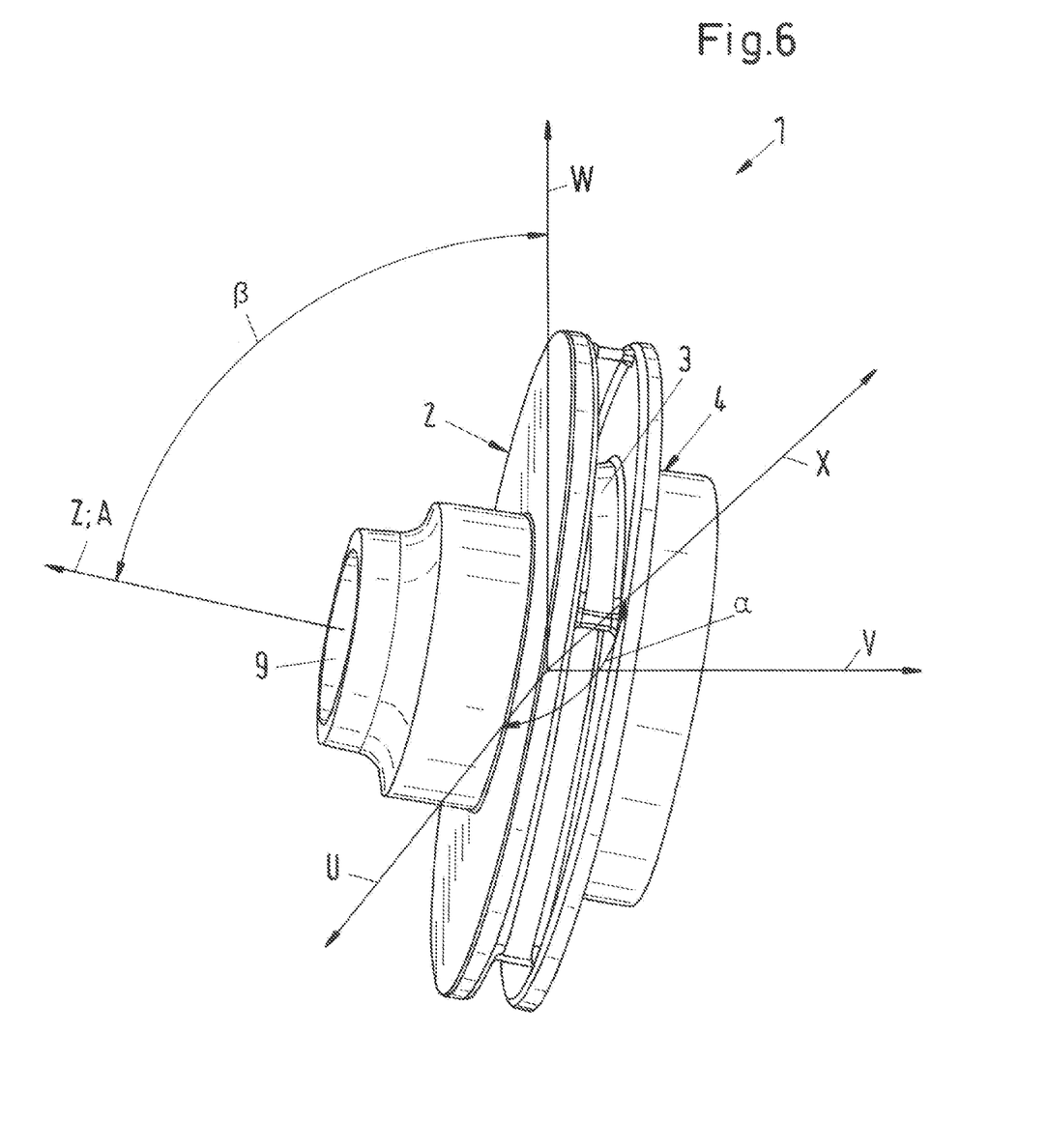
FIG. 6 is a perspective view of the impeller from FIG. 1 in a preferred structural orientation.

FIG. 6 shows the impeller 1 in a perspective view in a structural orientation, in which both the first angle β and the second angle α are different from zero. Starting from the initial orientation illustrated in FIG. 3, the impeller 1 and thus the component coordinate system, has first been rotated by the first angle β counterclockwise about the x-axis X of the component coordinate system and subsequently, by the second angle α counterclockwise about the z-axis Z of the component coordinate system. In doing so, the first angle β is 80° and the second angle α is 54°.

For the relative orientation, which is determined by the two angles β and α, it is then preferably determined computer-aided, where support structures 100 are needed and which geometric configuration the support structures have, so that the impeller 1 can be generated in the structural orientation described by the angle β and a by means of the build-up process. If the required support structures 100 have been determined, it is assessed, whether this structural orientation is already optimal or at least sufficiently good to generate the impeller 1 in this structural orientation. As already explained, this assessment can focus on various aspects, in particular, these can be the aspects that the number of support structures required is as small as possible and/or that the support structures are built up in such places where they can be removed after completion of the build-up process without a large effort.

If the current structural orientation turns out to be not yet sufficiently good in this assessment, the two angles β, α are varied in an optimizing process until an optimized structural orientation for the impeller 1 is determined. Then, the impeller 1 is generated according to this structural orientation by means of a build-up process.

The structural orientation illustrated in FIG. 6 with the first angle β=80° and the second angle α=54° is such a preferred optimized structural orientation, which has proven particularly for covered impellers with five or six vanes 3, wherein the wrap angle of each vane 3 is preferably 90° to 180°.

Figure 7:
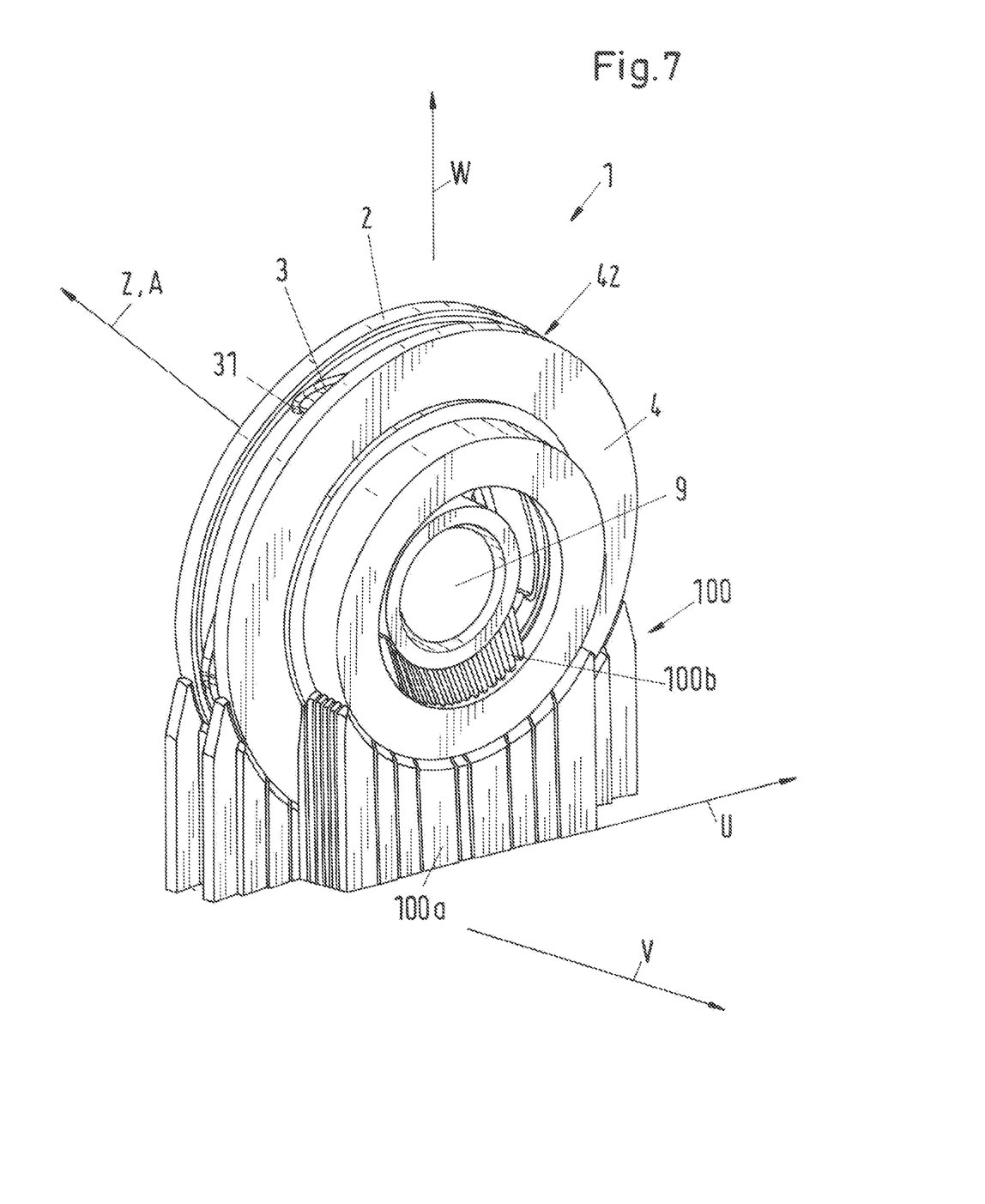
FIG. 7 is another perspective view of the impeller from FIG. 1 in a preferred structural orientation with support structures.

FIG. 7 shows the impeller 1 from FIG. 6 in another perspective view and in the same structural orientation as in FIG. 6, which is described by the two angles β=80° and α=54°. For a better understanding, some of the support structures 100 are also shown in FIG. 7, namely external support structures 100a, which support the shroud 2 and the cover plate 4, in particular, the outer radial limiting surface 42 and inner support structures 100b, which support the wall, by which the central axial opening 9 of the impeller 1 is limited. These inner support structures are provided here in the impeller 1, namely in the internal space 6 (FIG. 1). It can be seen that these external support structures 100a and in particular also the internal support structures 100b are provided at such points, which are still very easily accessible after the build-up process of the impeller 1, so that these support structures 100 can subsequently be removed without great effort.

The selection of a suitable structural orientation, i.e. the determination of optimized angles β and α depends on the geometry of the impeller 1, for example on the number of vanes 3 or on the wrap angle of the vanes 3. However, it has been shown for a large number of different impellers 1 that it is particularly favorable if the first angle β is at least 70° and at most 90°. It has proved to be particularly favorable if the first angle β is at least 75° and at most 85°. Especially preferred, in particular for covered impellers 1 with exactly five or exactly six vanes 3, the first angle β is about 80°.

Preferably, the second angle α is at most as large as the quotient of 360° and the number of vanes 3 of the impeller 1. In the case of an impeller with five vanes 3, the second angle α is thus preferably at most 72°, and in the case of an impeller 1 with exactly six vanes, the second angle α is therefore preferably at most 60°. These values for the second angle α are particularly preferred even if the vanes 3 each have a wrap angle of 90° to 180°. In particular, for an impeller 1 with exactly five or exactly six vanes 3, the second angle α is preferably at least 50° and at most 60°. Particularly preferred is a value of 54° for the second angle α.

It is clear, that post-processing of the impeller 1 can still be carried out after the build-up process of the impeller 1. These post-processing may comprise one or more of the following measures, for example: removal of powder residues; removal of the support structures 100; subtractive post-processing to improve geometric accuracy or roughness, e.g. by milling, turning, grinding; modification of the microstructure by heat treatment, compression of the material, e.g. with hot isostatic pressing (HIP); reduction of residual stresses.

The method according to the invention is particularly suitable for manufacturing impellers 1 for a rotary machine, in particular for a pump, a turbine, a compressor, a compactor or an expander. Particularly preferred, the method according to the invention can be used for manufacturing a covered impeller 1 of a rotary machine.

The invention claimed is:

1. A method for manufacturing an impeller of a rotary machine, the impeller comprising at least one vane limiting an inner channel which is at least partly closed, the method comprising:

successively manufacturing the impeller from several material layers by a build-up process from a powder, by applying the powder in each case to a processing plane for the production of each material layer;

producing a material layer from the powder by a selective energy input; and determining a structural orientation for the impeller, according to which the impeller is built up in layers, the structural orientation being defined by only a first angle and a second angle, the first and second angles defining the relative position of the impeller to the processing plane.

2. The method according to claim 1, further comprising producing support structures from the powder together with the material layers by the build-up process, removing the support structures after completion of the build-up process and optimizing the first and the second angle, so that the support structures are minimized.

3. The method according to claim 1, wherein the first angle indicates the angle between an axis of rotation of the impeller to be manufactured and a w-axis, the w-axis being perpendicular to the processing plane and pointing in a direction of the build-up process.

4. The method according to claim 3, wherein the first angle and the second angle define the relative position of a component coordinate system to a processing coordinate system, the component coordinate system being fixed with respect to the impeller and the processing coordinate system being fixed with respect to the processing plane, the component coordinate system having a z-axis, the z-axis being defined by the axis of rotation of the impeller, and an x-axis, the x-axis being defined by a connecting line, the connecting line being perpendicular to the z-axis and connecting the z-axis with a trailing edge of the vane, and the processing coordinate system comprises u-v-plane, which is defined by the processing plane, and the w-axis, which is perpendicular to the u-v-plane and points in the direction of the build-up process.

5. The method according to claim 4, wherein the structural orientation is defined relative to an initial orientation, wherein, when in the initial orientation the z-axis coincides with the w-axis and the x-axis lies in the u-v-plane.

6. The method according to claim 5, further comprising first rotating the component coordinate system by the first angle about the x-axis starting from the initial orientation, and then rotating the component coordinate system by the second angle about the z-axis to realize the structural orientation.

7. The method according to claim 1, wherein the at least one vane includes a plurality of vanes and the inner channel is one of a plurality of inner channels, and adjacent channels are each separated by a respective vane.

8. The method according to claim 7, further comprising optimizing the first angle and the second angle, so that support structures are avoided in areas of each inner channel of the plurality of inner channels, which are not or only with difficulty accessible for removal of the support structures.

9. The method according to claim 1, wherein the first angle is at least 70° and at most 90.

10. The method according to claim 1, wherein the second angle is at most as large as the quotient of 360° and the number of vanes.

11. The method according to claim 1, wherein the second angle is at least 50° and at most 60.

12. The method according to claim 1, wherein the impeller has exactly five or exactly six vanes.

13. The method according to claim 1, wherein the build-up process includes an energy input carried out by a laser.

14. The method according to claim 1, wherein the build-up process is carried out by selective laser melting.

15. An impeller for a rotary machine, comprising: the impeller manufactured by the method according to claim 1.

16. The impeller according to claim 15, wherein the impeller is for a pump, a turbine, a compressor, a compactor or an expander.

17. The method according to claim 1, wherein the first angle is at least 75° and at most 85°.

18. The method according to claim 1, wherein the first angle is about 80°.

19. The method according to claim 1, wherein the second angle is about 54°.

* * * * *